United States Patent
Harmouch et al.

(10) Patent No.: US 11,242,910 B2
(45) Date of Patent: Feb. 8, 2022

(54) PLATE LINK CHAIN WITH PLATES IN GROUPS OF THREE

(71) Applicant: Schaeffler Technologies AG & Co. KG, Herzogenaurach (DE)

(72) Inventors: Alaa Harmouch, Rheinstetten (DE); Yudhi Lukito, Bühl (DE); Stephan Penner, Bühl (DE); Carsten Trautmann, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1020 days.

(21) Appl. No.: 15/750,249

(22) PCT Filed: Aug. 24, 2016

(86) PCT No.: PCT/DE2016/200393
§ 371 (c)(1),
(2) Date: Jan. 9, 2019

(87) PCT Pub. No.: WO2017/032372
PCT Pub. Date: Mar. 2, 2017

(65) Prior Publication Data
US 2018/0223952 A1 Aug. 9, 2018

(30) Foreign Application Priority Data

Aug. 24, 2015 (DE) .......................... 102015011086.1
Dec. 18, 2015 (DE) .......................... 102015225860.2

(51) Int. Cl.
*F16G 5/18* (2006.01)
*F16G 13/06* (2006.01)
*F16H 9/24* (2006.01)

(52) U.S. Cl.
CPC ............... *F16G 5/18* (2013.01); *F16G 13/06* (2013.01); *F16H 9/24* (2013.01)

(58) Field of Classification Search
CPC ............... F16G 5/18; F16G 13/06; F16H 9/24
See application file for complete search history.

(56) References Cited

U.S. PATENT DOCUMENTS

| 5,147,250 A | 9/1992 | Mott | |
|---|---|---|---|
| 5,147,251 A * | 9/1992 | Cole, Jr. | ................... F16G 5/18 474/206 |
| 2008/0176693 A1 * | 7/2008 | Teubert | ..................... F16G 5/18 474/229 |

FOREIGN PATENT DOCUMENTS

| CN | 1526974 A | 9/2004 |
|---|---|---|
| DE | 3027334 A1 | 1/1981 |

(Continued)

OTHER PUBLICATIONS

International Search Report for PCT/DE2016/200393; 3 pgs; dated Dec. 19, 2016 by European Patent Office.

(Continued)

*Primary Examiner* — Michael R Mansen
*Assistant Examiner* — Juan J Campos, Jr.
(74) *Attorney, Agent, or Firm* — Kevin Parks

(57) ABSTRACT

A plate link chain for a continuously variable cone pulley transmission is disclosed. The plate link chain includes a first chain link, a second chain link, and a third chain link having plates and being connected to one another by joints having rocker pins. The rocker pins have end faces configured to transmit friction forces between the plate link chain and cone pulleys, wherein at least one of the plates has at least one overlapping tip. The first, second, and third chain links form a triplet and have different plate assemblies comprised of a first plate unit or a second plate unit, each of the chain links having at least one plate positioned transversely to a running direction of the plate link chain and are repeated in the running direction of the plate link chain.

17 Claims, 5 Drawing Sheets

(56) References Cited

FOREIGN PATENT DOCUMENTS

| | | |
|---|---|---|
| DE | 3826809 C1 | 8/1989 |
| DE | 102004007100 A1 | 9/2004 |
| EP | 0889259 A1 | 1/1999 |
| GB | 2221511 A | 2/1990 |
| JP | 2000027955 A | 1/2000 |
| JP | 2005299755 A | 10/2005 |
| JP | 2010512494 A | 4/2010 |
| JP | 2011524501 A | 9/2011 |
| WO | 2008/071145 A1 | 6/2008 |
| WO | 2008071145 A1 | 6/2008 |
| WO | 2009152797 A1 | 12/2009 |

OTHER PUBLICATIONS

Machine translation of WO2009152797A1 provided as a translation of JP2011524501A.

* cited by examiner

PLATE LINK CHAIN WITH PLATES IN GROUPS OF THREE

CROSS-REFERENCE TO RELATED APPLICATIONS

This application is the U.S. National Phase of PCT Appln. No. PCT/DE2016/200393 filed Aug. 24, 2016, which claims priority to German Application No. DE 10 2015 011 086.1 filed Aug. 24, 2015 and German Application No. DE 10 2015 225 860.2 filed Dec. 18, 2015, the entire disclosures of which are incorporated by reference herein.

TECHNICAL FIELD

The present disclosure relates to a plate link chain for a chain-driven CVT (Continuously Variable Transmission) having cone pulley pairs.

BACKGROUND

The arrangement of the plates in a group across the width of the chain has a major effect on the strength and life of the chain. The chains are built up "with plates in groups of three" comprising triplets, i.e. the arrangement of the plates is repeated every three links and without taking into account the types of plate. Normally, plate types of different lengths are also used, producing links of nonuniform length, in order to minimize or whiten the noise generated by the impact of the rocker pins on the cone pulleys.

WO 2008/071145 A1 shows various plate link chains for continuously variable cone pulley transmissions, the chain links of which, which have plates, are connected to one an-other by joints which have rocker pins, wherein the end faces of these joints transmit the friction forces between the plate link chain and the cone pulleys. In this case, the plate link chain has a chain design with plates in groups of three, in which three successive chain links—a "triplet"—have different plate arrangements composed of plate units, each having at least one plate transversely to the running direction of the plate link chain, and are repeated in the longitudinal direction of the plate link chain. The plates of some of these plate link chains have overlapping tips, i.e. are tipped plates. In the case of others of the plate link chains shown, plates having overlapping tips, i.e. tipped plates, have been dispensed with entirely.

SUMMARY

It is the object of the present disclosure to further reduce the maximum loads on the plates and on the rocker pins in operation in order in this way to provide a chain with a longer life.

In the case of the plate link chain for continuously variable cone pulley transmissions, the chain links of which plate link chain, which have plates, are connected to one another by joints which have rocker pins and whose end faces transmit the friction forces between the plate link chain and the cone pulleys, wherein at least one of the plates, preferably several of the plates, in particular each of the plates, has at least one overlapping tip and the plate link chain has a chain design with plates in groups of three, in which three successive chain links have different plate arrangements composed of plate units, each having at least one plate transversely to the running direction of the plate link chain, and are repeated in the longitudinal direction of the plate link chain, it is provided, according to the present disclosure, that the plate units comprise first plate units and second plate units, wherein each of the first plate units is designed as an individual plate of a defined thickness and each of the second plate units has a considerably greater thickness than the first plate unit and (i) the first of the chain links has only first plate units, (ii) the second of the chain links has either only first plate units or both first plate units and at least one second plate unit, wherein the outer plate units of the plate arrangement are first plate units and (iii) the third of the chain links has only second plate units. Tests have shown that plate link chains constructed in this way have a higher strength and a longer life than known plate link chains with different chain designs with plates in groups of three.

In the case of the plate link chains with plates in groups of three discussed in the context of the present disclosure, the overlapping tips serve, in particular, to prevent jamming between individual plates. Further details on plates with overlapping tips (i.e. tipped plates) and on the operation of the plate tips in plate link chains can be found in the initially cited document WO 2008/071145 A1, for example.

In particular, it is provided that the second of the chain links has either only first plate units or both first plate units and at least one second plate unit, wherein only the outer plate units of the plate arrangement are first plate units, i.e. the other plate unit or the other plate units, which is/are therefore not arranged on the outside, are second plate units.

According to an embodiment of the present disclosure, it is provided that the thickness of the second plate unit is twice the thickness of the first plate unit.

Tests have shown that the construction according to the present disclosure ensures relatively low loads on the plates and rocker pins during operation, irrespective of the number of plates or plate units in the respective plate assembly transversely to the running direction, i.e. irrespective of the chain width. This has been found significant, especially for relatively narrow plate link chains but also for relatively wide plate link chains, since, in this case, there is a particular requirement for a reduction in the maximum loads on the plates and rocker pins during operation. It is accordingly advantageous to provide for the first of the chain links to have either six or fewer (i.e. two, four or six) first plate units or, alternatively, ten or more (i.e. ten, twelve, fourteen, . . . ) first plate units.

According to another embodiment of the present disclosure, the second plate unit is designed as a double plate formed from two plates.

In a number of advantageous embodiments, a plate link chain of this kind has a chain design with plates in groups of three, in which three successive links (triplet) have different plate arrangements comprising individual and double plates transversely to the running direction of the chain and are repeated in the longitudinal direction of the chain. The present disclosure pro-vides a particular arrangement of the individual plates to form double plates, wherein link 1 (the first of the chain links) comprises only individual plates. Link 2 (the second of the chain links) comprises individual and/or double plates, wherein the outer plates are individual plates and the remaining plates are double plates. Link 3 (the third of the chain links) comprises only double plates.

As an alternative, it is likewise advantageous to make provision for the second plate unit to be designed as a single thick plate (thick plate) of higher thickness, in particular of double thickness, than the individual plate with the defined thickness. In other words, the double plates mentioned can be implemented by individual thick plates of double plate thickness. However, it is also possible for the thick plates to have a thickness other than the double thickness.

Furthermore, the double plate in the center of the chain can be replaced by an individual plate, allowing more flexible construction of the chains in terms of the width thereof.

This triplet construction is independent of the types of plate, i.e. whether long plates or short plates are used and independent of the pitch of the plates. The length of the plates in the individual chain links therefore differs. In particular, two plates of different lengths, i.e. a shorter plate and a plate of greater length than said shorter plate, are provided in this case. Since the plates or at least some of these plates have overlapping tips, there are opportunities to construct a triplet which would lead to restricted functioning if the use of plates with overlapping tips were dispensed with. By using plates with overlapping tips in an assembly with plates in groups of three, it is thus possible to have two longer plates in direct succession, which would not be possible if the use of plates with overlapping tips were dispensed with.

It is advantageous if the chain links of different lengths are arranged nonuniformly in the running direction of the chain.

The chain can be constructed from blocks which each comprise six plates with two plates per link or triplet. The block, in turn, is mirror-symmetrical and comprises three plates.

With the aid of this block, it is possible to form plate link chains of different widths in modular fashion. A chain comprises at least one block.

The number of plates for each link can be the same, and the number of plates in the link is preferably divisible by two.

In particular, a plurality of blocks is arranged adjacent to one another transversely to the running direction.

Plate link chains of various widths can advantageously be formed in a modular fashion with the aid of the blocks.

According to another embodiment of the present disclosure, it is provided that the plates of the block are associated with the following chain links of the triplet in the stacking direction transverse to the running direction of the resulting plate link chain: second chain link, first chain link, third chain link, third chain link, first chain link and second chain link.

If the first three plates of the block are associated with the following chain links of the triplet in the stacking direction transverse to the running direction of the resulting plate link chain: second chain link, first chain link, third chain link, a six-plate block is obtained by mirroring. This can be lined up as many times as required to produce chains of different widths. The length of the plates and types of the plates are irrelevant here.

The present disclosure furthermore relates to a method for constructing an abovementioned plate link chain with plates in groups of three constructed from triplets comprising three successive chain links. It is provided here that each of the triplets is constructed from at least one block comprising six plates.

BRIEF DESCRIPTION OF THE DRAWINGS

The present disclosure is explained by way of example below with reference to the drawings, wherein the following features explained below can each form an aspect of the present disclosure either individually or in combination. In the drawings.

DETAILED DESCRIPTION

Figure 1:
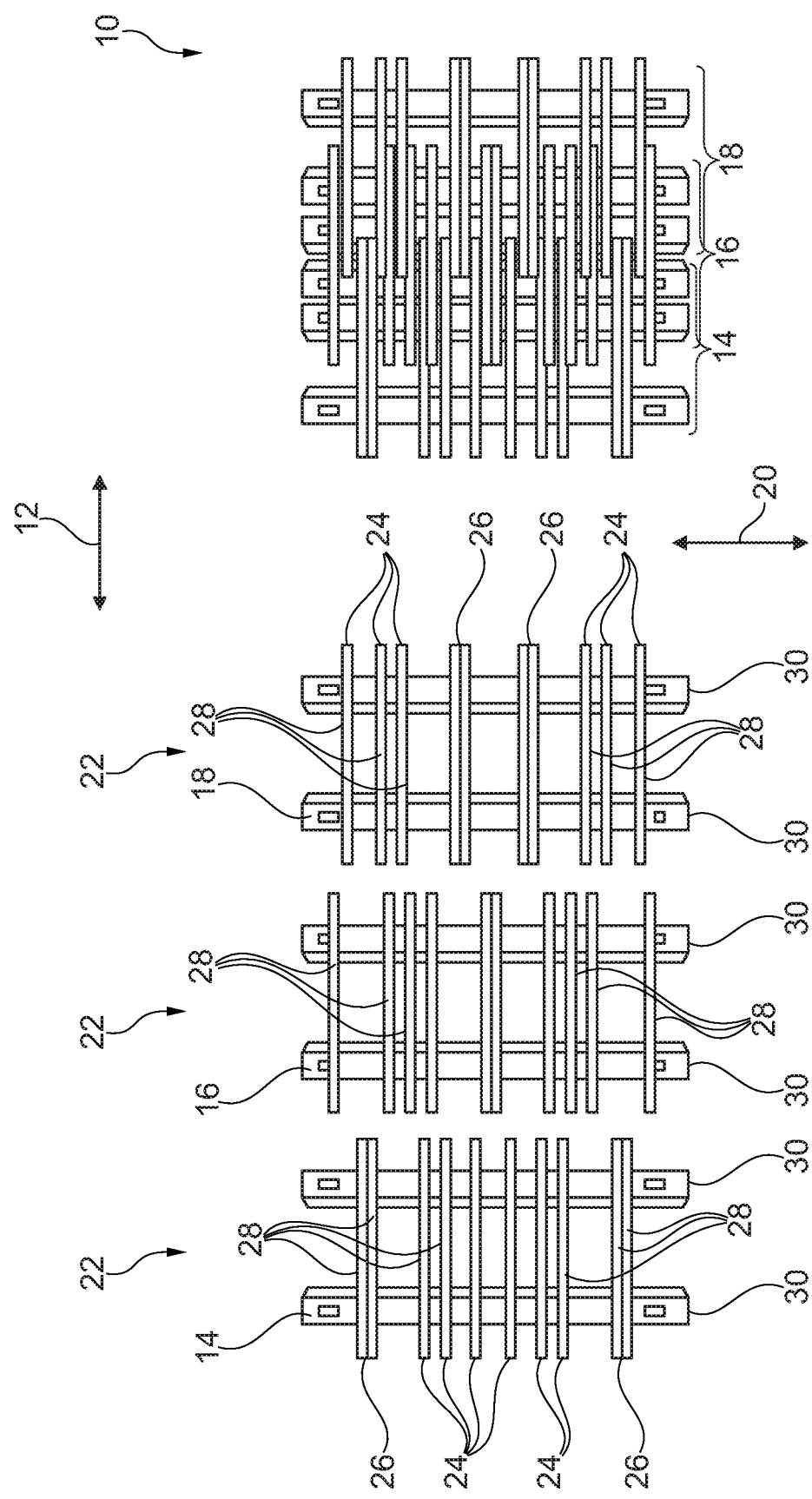
FIG. 1 shows the fundamental construction of a triplet comprising three chain links of a plate link chain not according to the present disclosure.

FIG. 1 shows the fundamental construction of a triplet 10 comprising three chain links 14, 16, 18 with plates in groups of three, said chain links being arranged one behind the other in the running direction (double arrow 12) of the resulting plate link chain. In this case, the chain links 14, 16, 18 are first of all shown individually on the left in FIG. 1, while they are shown after the assembly to form the triplet 10 on the right in FIG. 1. However, the triplet 10 shown in FIG. 1 does not correspond to the triplet 10 for the construction of a plate link chain according to the present disclosure and is used here merely to illustrate the fundamental construc-tion and to introduce the individual components. The triplet 10 is the characteristic unit of a plate link chain, constructed with plates in groups of three, for continuously variable cone pulley transmissions. Each of the chain links 14, 16, 18 of the plate link chain as plate arrangements 22, each arranged transversely to the running direction of the plate link chain (double arrow 20) and having a plurality of plate units 24, 26 which, for their part, are constructed from plates 28. Here, the plates 28 are all, or at least in some cases, designed as tipped plates, i.e. has plates 28 which each have at least one overlapping tip. The plate arrangement 22 of the corresponding chain link 14, 16, 18 is characteristic of the corresponding chain link 14, 16, 18, wherein the respective chain links or the plate arrangements 22 thereof are repeated in the running direction of the plate link chain (double arrow 12) in accordance with the plate design with plates in groups of three. In this arrangement, the chain links 14, 16, 18 are connected to one another by joints which have rocker pins 30, wherein the end faces of these rocker pins or joints 30 transmit the friction forces be-tween the plate link chain and the cone pulleys. Two different types of plate unit 24, 26 are pro-vided to construct the chain links 14, 16, 18. Each of the first plate units 24, i.e. each plate unit of the first type, is designed as an individual plate 28 of a defined thickness, and each of the second plate units, i.e. each plate unit of the second type, has a significantly greater thickness than the first plate unit. In the example under consideration, the thickness of the second plate unit 26 is twice the thickness of the first plate unit 24 since the second plate unit 26 comprises two plates 28 of the defined thickness resting against one another in parallel. The second plate units 26 are thus designed as double plates formed from two plates 28.

Figure 7:
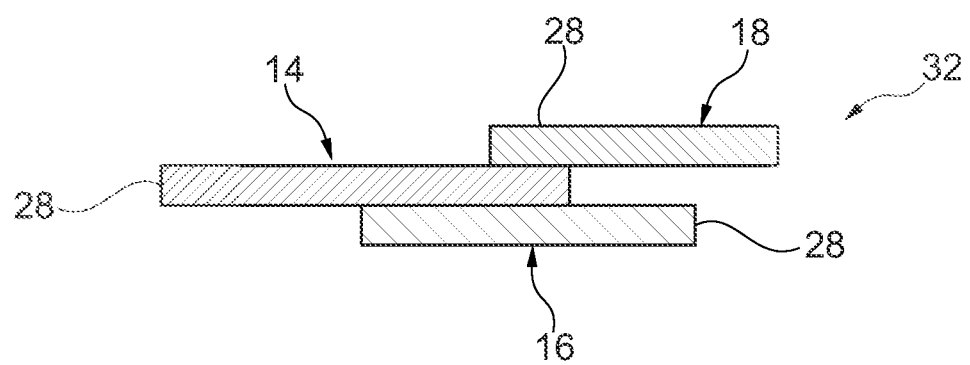
FIG. 7 shows a three-plate unit with plates of different lengths for the construction of triplets according to embodiments disclosed herein.

Although the plates 28 in this rather schematic illustration are shown as being all of the same length, the lengths of the plates 28 in the individual chain links 14, 16, 18 can, of course, also be different (ref. FIG. 7). In particular, there can be two plates 28 of different lengths, i.e. one shorter plate and one longer plate. In this case, the chain links 14, 16, 18 of different lengths are generally arranged in a nonuniformly distributed manner in the running direction of the chain.

Figure 2A:
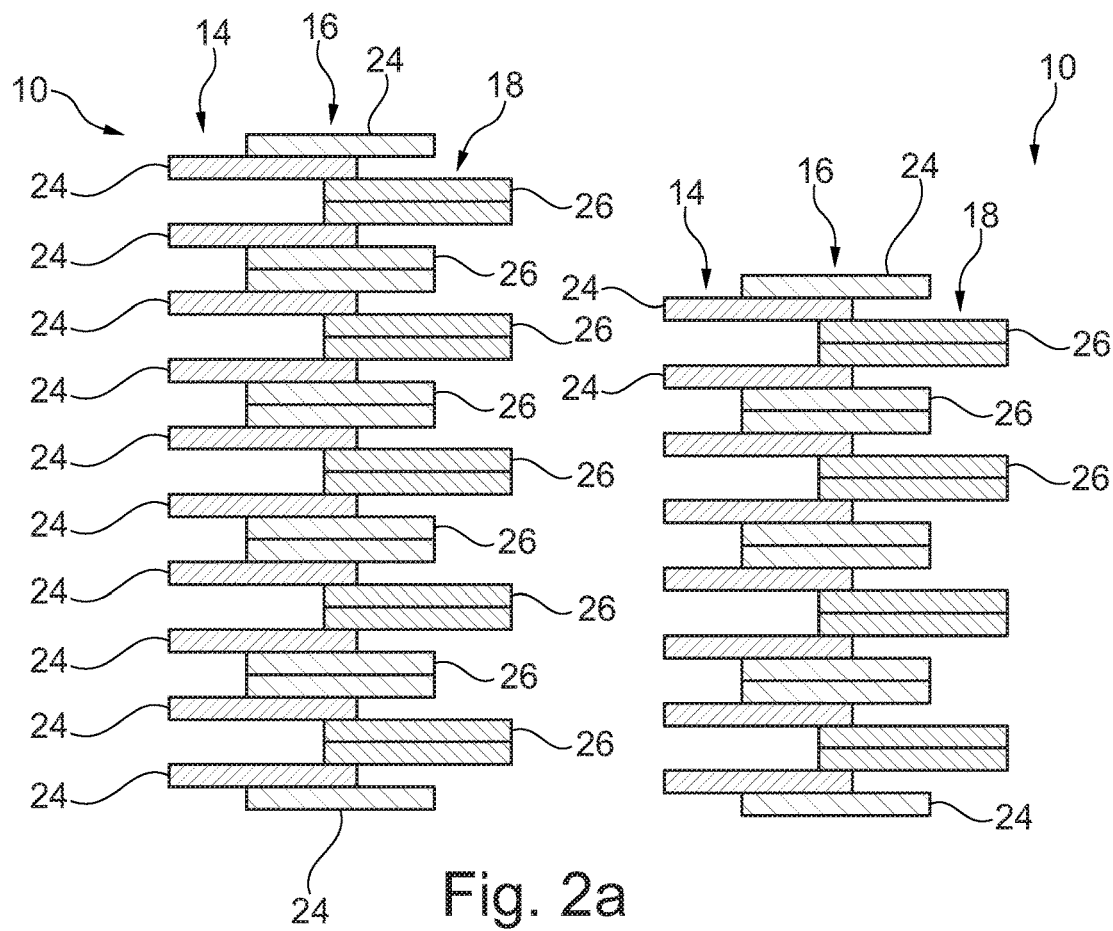
FIG. 2a shows two triplets, each comprising three chain links, for different embodiments of the plate link chain according to the present disclosure.

FIG. 2a shows two schematic illustrations of triplets 10 for plate link chains according to the present disclosure of various widths with plates in groups of three. In particular, the joints formed from rocker pins 30 are not shown in this illustration. Here too, two different types of plate unit 24, 26 are provided to construct the chain links 14, 16, 18. Here too, each of the first plate units 24, i.e. each plate unit of the first type, is designed as an individual plate 28 of the defined thickness, and each of the second plate units 26, i.e. each plate unit of the second type, has a significantly greater thickness than the first plate unit 24, namely once again twice the thickness of the first plate unit 24, because the second plate unit 26 comprises two plates 28 of the defined thickness resting against one another in parallel. Furthermore, it is provided, in the case of these triplets 10 or of the plate link chain constructed therefrom, that (i) the first of the chain links 14 has only first plate units 24, (ii) the second of the chain links 16 has both first plate units 24 and second plate units 26, wherein only the two outer plate units 24 of the plate assembly 22 are first plate units 24, and (iii) the third of the chain links 18 has only second plate units 26.

In FIGS. 3-6b, further aspects of the construction and configuration of triplets 10 and plate link chains constructed therefrom are described, and therefore it is primarily these further aspects which are discussed below without once again describing in detail the construction of the triplets 10 and of the plate link chains constructed therefrom.

Figure 2B:
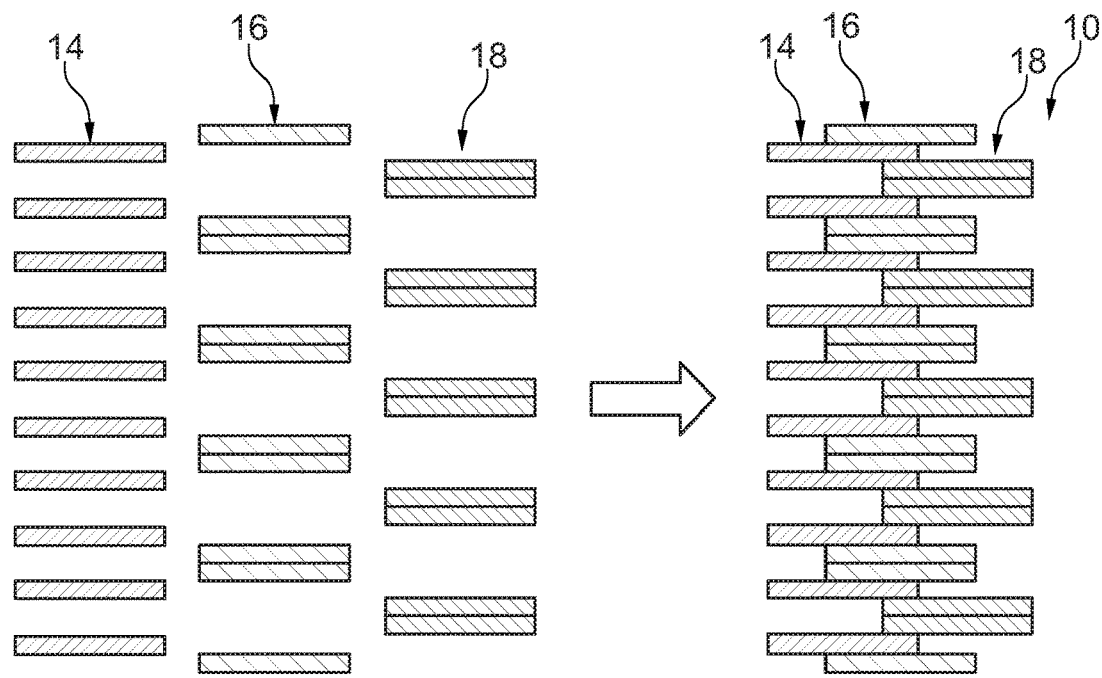
FIG. 2b shows the construction of one of the triplets shown in FIG. 2a, FIG. 3 shows a three-plate unit for the construction of triplets according to embodiments disclosed herein.

FIG. 2b illustrates how three chain links 14, 15, 16 are connected to form a triplet 10. The resulting triplet 10 corresponds to the triplet 10 illustrated on the left in FIG. 2a.

Figure 3:
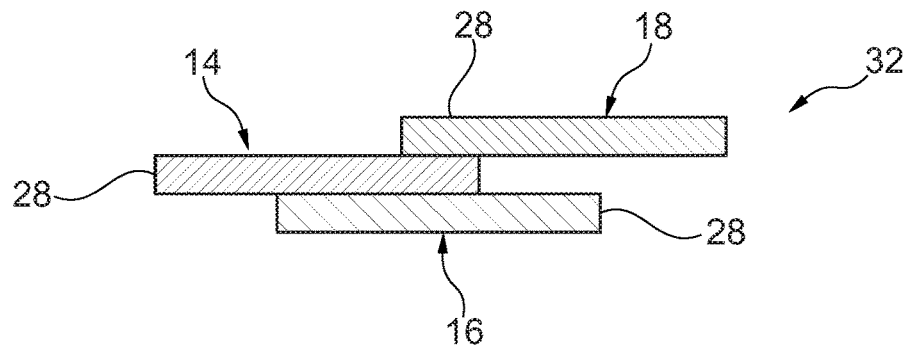
Figure 4:
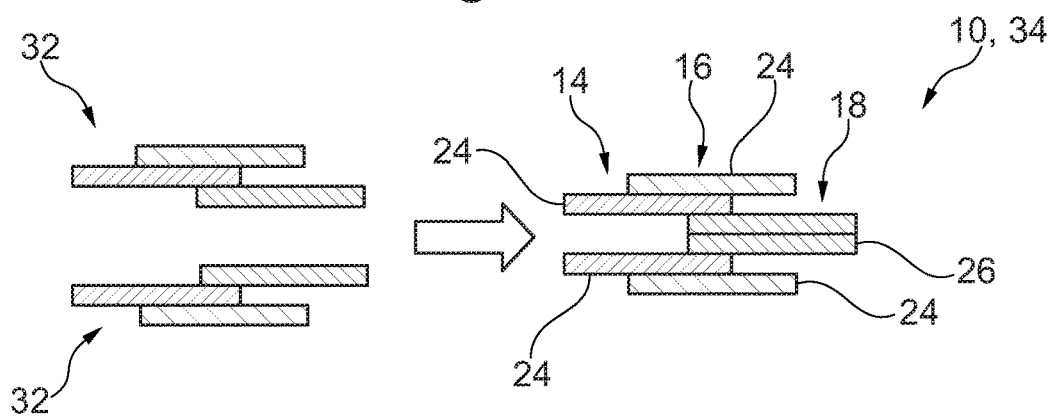
FIG. 4 shows the construction of a module for the production of different embodiments of the plate link chain according to the present disclosure comprising three-plate units.

FIG. 3 illustrates the arrangement of three plates 28 in a three-plate unit 32 for the modular construction of triplets 10. The three plates 28 of this three-plate unit 32 are associated as follows with the following chain links of the triplet 10 in the stacking direction (double arrow 20) transverse to the running direction of the resulting plate link chain: second chain link 16, first chain link 14, third chain link 18. If the first three plates 28 are ordered as shown in FIG. 3, a six-plate block (block 34) shown in FIG. 4 is obtained by mirroring. This block 34 itself is a very simple triplet 10. FIG. 4 shows the construction of such a block 34 of six plates with two plates per chain link 14, 16, 18, wherein two mirrored three-plate units 32 from FIG. 3 give one block 34. This block 34 can be lined up as many times as required to produce triplets 10 or chains of different widths. The length of the plates 28 and types of plate are irrelevant here.

Figure 5:
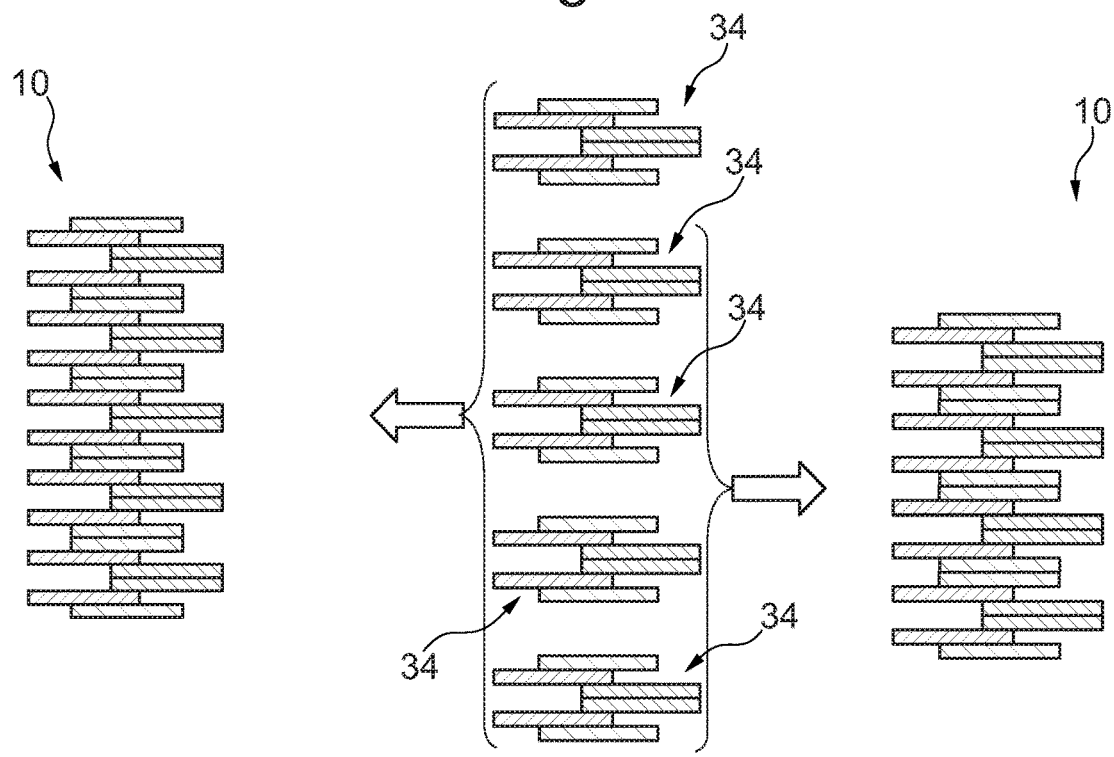
FIG. 5 shows two triplets, produced from modules, for different embodiments of the plate link chain according to the present disclosure.

FIG. 5 illustrates the chain width depending on the number of blocks 34 for two different chain widths, namely a width of four blocks 34 (on the right) and five blocks (on the left).

Figure 6A:
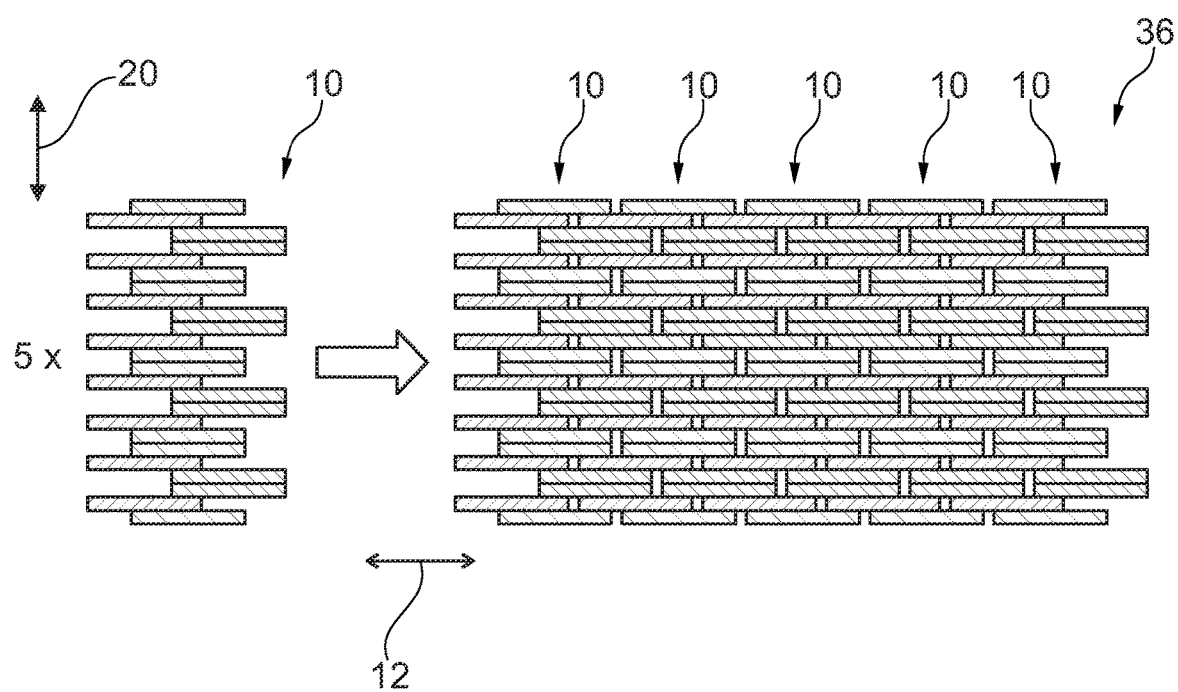
FIG. 6a shows a chain segment, produced from the first triplet shown in FIG. 5, of one embodiment of the plate link chain according to the present disclosure.
Figure 6B:
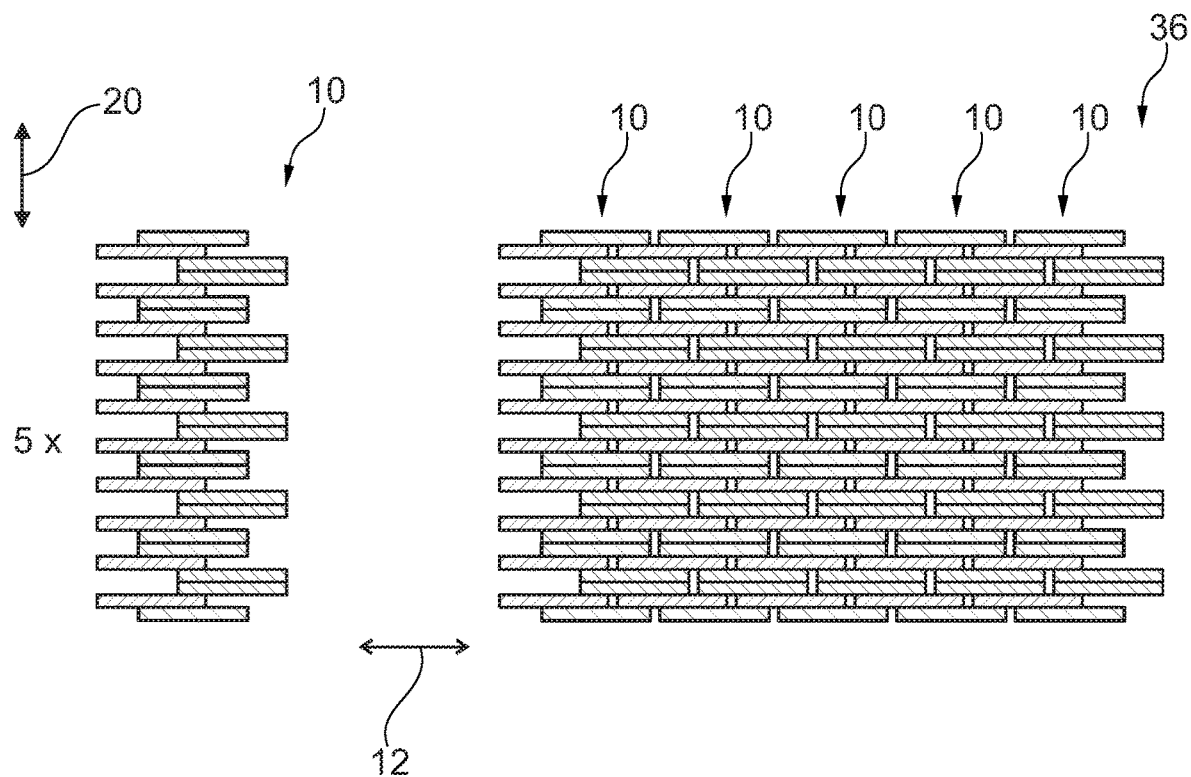
FIG. 6b shows a chain segment, produced from the second triplet shown in FIG. 5, of one embodiment of the plate link chain according to the present disclosure.

Finally, FIGS. 6a and 6b show the construction of the plate link chain by means of a respective chain segment 36, along the length thereof, showing five triplets 10 lined up in a row and two chains of different widths comprising four blocks 34 (FIG. 6a) and five blocks 34 (FIG. 6b) transversely to the running direction of the chain.

The properties of the plate link chains that can be produced from the triplets 10 shown will be described once again in different words below:

This is a plate link chain for continuously variable cone pulley transmissions, the chain links 14, 16, 18, which comprise plates 28, are connected to one another by joints comprising rocker pins 30 and whose end faces transmit the friction forces between the plate link chain and the cone pulleys. In this arrangement, the plate link chain has a chain design with plates in groups of three, in which three successive links (triplet 10) have different plate arrangements—link 1 14, link 2 16 and link 3 18—comprising individual and double plates transversely to the running direction of the plate link chain and are repeated in the longitudinal direction of the chain. Here, it is provided that link 1 14 comprises only individual plates, link 2 18 comprises individual and/or double plates, wherein the outer plates are individual plates, and link 3 20 comprises only double plates.

The length of the plates 28 in the individual links preferably differs, in particular two plates of different lengths are provided and the links of different lengths are arranged nonuniformly in the running direction of the chain.

It is advantageous if the plate link chain is constructed from at least one block 34 comprising six plates 28 transversely to the running direction of the chain, said block forming a triplet 10. In this case, in particular, a plurality of blocks 34 is lined up transversely to the running direction. Preferably, provision is made here to enable plate link chains of various widths to be formed in a modular fashion with the aid of the blocks 34.

In particular, it is provided that the double plates are replaced by individual thick plates with a greater thickness than the individual plates, in particular with twice the plate thickness.

LIST OF REFERENCE NUMBERS 10 triplet
12 double arrow (running direction)
14 first chain link
16 second chain link
18 third chain link
20 double arrow (transverse direction)
22 plate arrangement
24 first plate unit
26 second plate unit
28 plate
30 pin
32 three-plate unit
34 block
36 chain segment

The invention claimed is:

1. A plate link chain for a continuously variable cone pulley transmission, comprising:

a first chain link, a second chain link, and a third chain link having plates and being connected to one another by joints having rocker pins, the rocker pins having end faces configured to transmit friction forces between the plate link chain and cone pulleys, wherein at least one of the plates has at least one overlapping tip, wherein the first, second, and third chain links form a triplet and have different plate arrangements comprised of a first plate unit or a second plate unit, each of the chain links having at least one plate positioned transversely to a running direction of the plate link chain and are repeated in the running direction of the plate link chain, and wherein the first chain link has a plate arrangement including six or fewer of the first plate unit or ten or more of the first plate unit.

2. The plate link chain of claim 1, wherein the first plate unit is comprised of an individual plate and the second plate unit is comprised of two plates.

3. The plate link chain of claim 1, wherein the first plate unit has a first thickness and the second plate unit has a second thickness, the second thickness being greater than the first thickness.

4. The plate link chain of claim 1, wherein the first plate unit has a first thickness and the second plate unit has a second thickness, the second thickness being twice that of the first thickness.

5. The plate link chain of claim 1, wherein:
the first chain link has a plate arrangement consisting of first plate units;
the second chain link has a plate arrangement consisting of first plate units; and
the third chain link has a plate arrangement consisting of second plate units.

6. The plate link chain of claim 1, wherein:
the first chain link has a plate arrangement consisting of first plate units;
the second chain link has a plate arrangement consisting of first plate units and second plate units, wherein only an outer plate unit of the second chain link plate arrangement comprises the first plate unit; and
the third chain link has a plate arrangement consisting of second plate units.

7. The plate link chain of claim 1, wherein a length of each plate in the first, second, and third chain links is different and each plate is arranged in a non-uniformly distributed manner in the running direction of the plate link chain.

8. The plate link chain of claim 7, wherein the first, second, and third chain links each include at least two plates of different lengths.

9. The plate link chain of claim 1, wherein the triplet formed from the first, second, and third chain links includes two chain links with longer plates.

10. The plate link chain of claim 1, wherein the plate link chain is constructed from at least one block of six plates positioned transversely to the running direction, wherein the block forms the triplet comprised of the first, second, and third chain links.

11. The plate link chain of claim 10, wherein a plurality of blocks is arranged adjacent to one another transversely to the running direction.

12. The plate link chain of claim of 10, wherein the first, second, and third chain links are of varying widths and can be formed in a modular fashion.

13. The plate link chain of claim 10, wherein the plates of the block are associated with the first, second, and third chain links in a stacking direction transverse to the running direction of the resulting plate link chain arranged in the following order: the second chain link, the first chain link, the third chain link, the third chain link, the first chain link, and the second chain link.

14. A plate link chain for a continuously variable cone pulley transmission, comprising:
a first chain link, a second chain link, and a third chain link having a plurality of plates and being arranged one behind another in a running direction of the plate link chain, wherein:
the first, second, and third chain links have different plate arrangements comprised of a first plate unit or a second plate unit,
each of the chain links has at least one plate positioned transversely to the running direction of the plate link chain,
the first chain link has a plate arrangement consisting of first plate units,
the second chain link has a plate arrangement consisting of first plate units arranged as outer plate units, and second plate units arranged as inner plate units, and
the third chain link has a plate arrangement consisting of second plate units.

15. The plate link chain of claim 14, wherein the first plate unit includes an individual plate having a first thickness and the second plate unit includes two plates resting against one another in parallel having a second thickness, wherein the second thickness of the second plate unit is greater than the first thickness of the first plate unit.

16. The plate link chain of claim 14, wherein the first, second, and third chain links are assembled in a stacking direction transverse to the running direction of the plate link chain, wherein the chain links are stacked in the following order: the second chain link, the first chain link, and then the third chain link.

17. The plate link chain of claim 14, wherein the plate link chain is constructed from at least one block comprising six plates arranged transversely to the running direction of the plate link chain, wherein the at least one block is formed from mirroring a three-plate unit including chain links ordered as follows: the second chain link, the first chain link, and the third chain link.

* * * * *